(12) United States Patent
Akkary et al.

(10) Patent No.: US 7,752,423 B2
(45) Date of Patent: Jul. 6, 2010

(54) AVOIDING EXECUTION OF INSTRUCTIONS IN A SECOND PROCESSOR BY COMMITTING RESULTS OBTAINED FROM SPECULATIVE EXECUTION OF THE INSTRUCTIONS IN A FIRST PROCESSOR

(75) Inventors: Haitham Akkary, Portland, OR (US); Sebastien Hily, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 1308 days.

(21) Appl. No.: 09/896,526

(22) Filed: Jun. 28, 2001

(65) Prior Publication Data
US 2003/0005266 A1 Jan. 2, 2003

(51) Int. Cl.
*G06F 9/00* (2006.01)
(52) U.S. Cl. .................. 712/220; 712/218
(58) Field of Classification Search .......... 712/235, 712/244, 34, 35, 218, 220; 718/106; 714/11
See application file for complete search history.

(56) References Cited

U.S. PATENT DOCUMENTS

| | | | | |
|---|---|---|---|---|
| 5,961,631 A * | 10/1999 | Devereux et al. | ........... | 712/207 |
| 6,161,167 A | 12/2000 | Witt | | |
| 6,233,599 B1 | 5/2001 | Nation et al. | | |
| 6,353,881 B1 * | 3/2002 | Chaudhry et al. | ........... | 712/228 |
| 6,598,122 B2 * | 7/2003 | Mukherjee et al. | .......... | 711/126 |
| 6,629,271 B1 * | 9/2003 | Lee et al. | ..................... | 714/49 |
| 6,757,811 B1 * | 6/2004 | Mukherjee | .................. | 712/220 |
| 7,017,073 B2 * | 3/2006 | Nair et al. | ...................... | 714/11 |
| 2001/0037447 A1 | 11/2001 | Mukherjee et al. | | |
| 2002/0144083 A1 * | 10/2002 | Wang et al. | ................... | 712/23 |

FOREIGN PATENT DOCUMENTS

| | | |
|---|---|---|
| WO | WO 92/03794 | 3/1992 |
| WO | WO 9931594 A1 * | 6/1999 |
| WO | WO 00/68781 | 11/2000 |

(Continued)

OTHER PUBLICATIONS

E. Rotenberg, Q. Jacobson, Y. Sazeides, and J. Smith. Trace processors. In Proceedings of the 30th Annual International Symposium on Microarchitecture, pp. 138-148, Dec. 1-3, 1997.*

(Continued)

*Primary Examiner*—David J Huisman
(74) *Attorney, Agent, or Firm*—Trop, Pruner & Hu, P.C.

(57) ABSTRACT

A device is presented including a first processor and a second processor. A number of memory devices are connected to the first processor and the second processor. A register buffer is connected to the first processor and the second processor. A trace buffer is connected to the first processor and the second processor. A number of memory instruction buffers are connected to the first processor and the second processor. The first processor and the second processor perform single threaded applications using multithreading resources. A method is also presented where a first thread is executed from a first processor. The first thread is also executed from a second processor as directed by the first processor. The second processor executes instructions ahead of the first processor.

32 Claims, 7 Drawing Sheets

FOREIGN PATENT DOCUMENTS

WO      WO 01/33352 A1     5/2001

OTHER PUBLICATIONS

Dean M. Tullsen, Susan J. Eggers, and Henry M. Levy. Simultaneous multithreading: Maximizing on-chip parallelism. In Proceedings of the 22nd Annual International Symposium on Computer Architecture, pp. 392-403, Jun. 22-24, 1995.*

A. Roth and G. Sohi. Speculative Data-Driven Multithreading. In HPCA-7, Jan. 2001.*

K. Sundaramoorthy, Z. Purser, and E. Rotenberg. Slipstream Processors: Improving both Performance and Fault Tolerance. ASPLOS-IX, Nov. 2000.*

Hennessy and Patterson, "Computer Architecture A Quantitave Approach", Morgan Kaufmann, 1996.*

Tanenbaum, "Structured Computer Organization", Prentice-Hall, 1984.*

Hennessy and Patterson, "Computer Architecture—A Quantitative Approach, 2nd Edition," 1996, pp. 241-242, 247.*

Rotenberg, "AR-SMT: A Microarchitectural Approach To Fault Tolerance In Microprocessors," 1999.*

IBM Technical Disclosure Bulletin, IBM Corp. 1993 "Dealer Instruction Processing Unit Governor-Joint Recursive Branch Prediction" (4 pages: 137-140).

* cited by examiner

| TAG | VALID | DATA | STORE ID | THREAD |
|-----|-------|------|----------|--------|
| 420 | 430   | 440  | 450      | 460    |
|     |       |      |          |        |
|     |       |      |          |        |
|     |       |      |          |        |
|     |       |      |          |        |
| ⋮   | ⋮     | ⋮    | ⋮        | ⋮      |
|     |       |      |          |        |
|     |       |      |          |        |

| TAG | VALID | LOAD ID | LOAD THREAD ID |
|-----|-------|---------|----------------|
| 520 | 530   | 540     | 550            |
|     |       |         |                |
|     |       |         |                |
|     |       |         |                |
|     |       |         |                |
| ⋮   | ⋮     | ⋮       | ⋮              |
|     |       |         |                |
|     |       |         |                |

FIG. 9

AVOIDING EXECUTION OF INSTRUCTIONS IN A SECOND PROCESSOR BY COMMITTING RESULTS OBTAINED FROM SPECULATIVE EXECUTION OF THE INSTRUCTIONS IN A FIRST PROCESSOR

BACKGROUND OF THE INVENTION

1. Field of the Invention

This invention relates to multiprocessors, and more particularly to a method and apparatus for multithreaded execution of single-thread programs.

2. Description of the Related Art

In many processing systems today, such as personal computers (PCs), single chip multiprocessors (CMP) play an important roll in executing multithreaded programs. The threads that these processors may process and execute are independent of each other. For instance, threads may be derived from independent programs or from the same program. Some threads are compiled creating threads that do not have dependencies between themselves. In a multi-threading environment, however, some single-thread applications may be too difficult to convert explicitly into multiple threads. Also, running existing single-thread binaries on multi-threading processor does not exploit the multi-threading capability of the chip.

BRIEF DESCRIPTION OF THE DRAWINGS

The invention is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

DETAILED DESCRIPTION OF THE INVENTION

The invention generally relates to an apparatus and method to multithreaded execution of single-thread programs. Referring to the figures, exemplary embodiments of the invention will now be described. The exemplary embodiments are provided to illustrate the invention and should not be construed as limiting the scope of the invention.

Figure 1:
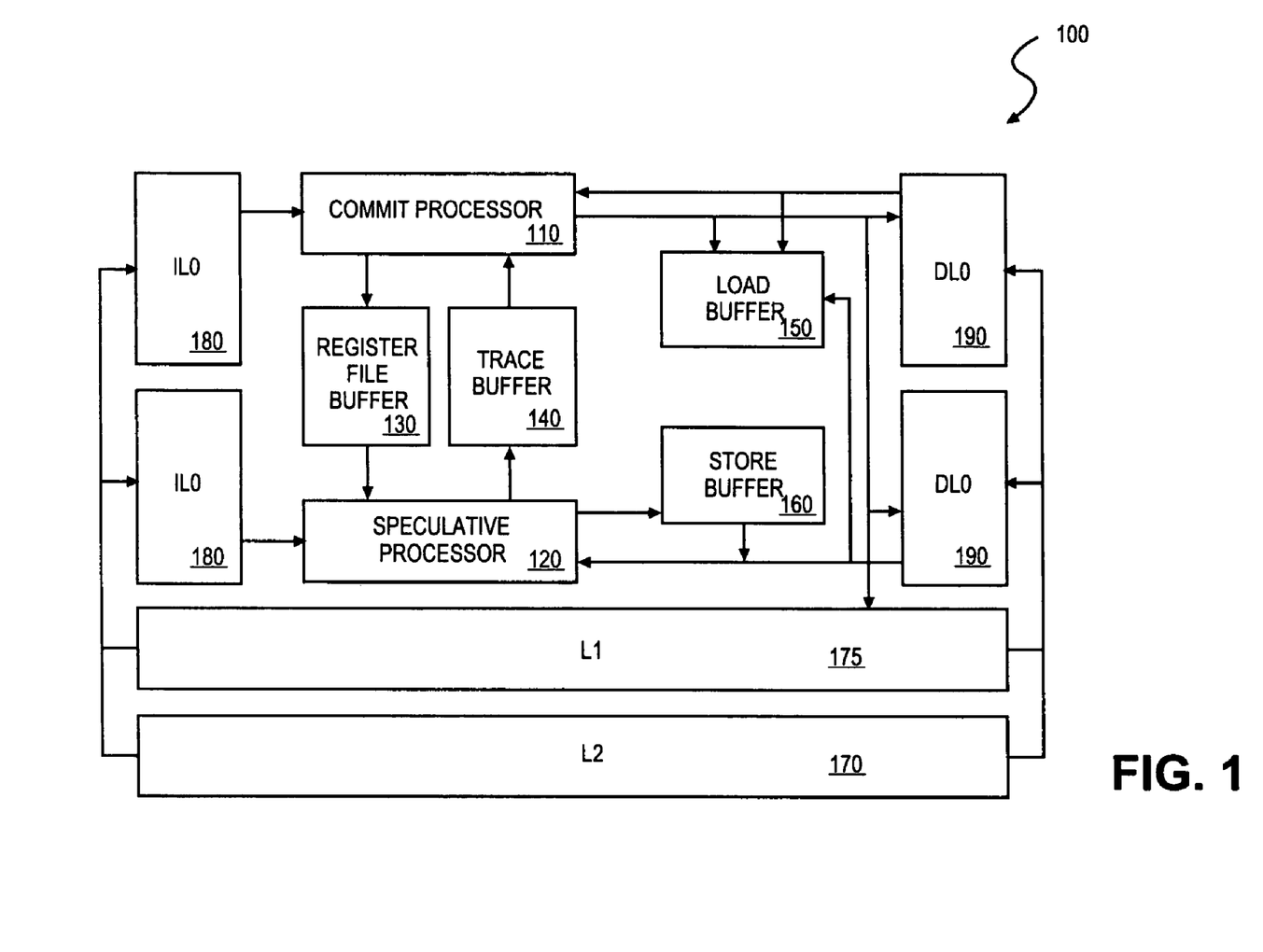
FIG. 1 illustrates an embodiment of the invention.

FIG. 1 illustrates one embodiment of the invention comprising multiprocessor 100. In one embodiment of the invention, multiprocessor 100 is a dual core single chip multiprocessor (CMP). Multiprocessor 100 further comprises commit central processing unit (CPU) 110, speculative CPU 120, register file buffer 130, trace buffer 140, load buffer 150 (also known as load ordering buffer), store buffer 160 (also known as store forwarding buffer), L1 cache 175, L2 cache 170, L0 instruction cache (I cache) 180, and L0 data cache (D cache) 190. In one embodiment of the invention L0 I cache 180 comprises two L0 I cache components. One of the L0 I cache 180 components is coupled to commit processor 110, and the other L0 I cache 180 component is coupled to speculative processor 120. In this embodiment of the invention, the two I cache components maintain duplicate information. In one embodiment of the invention, fetch requests are issued to L1 cache 175 from either of the L0 I cache 180 components. Lines fetched from L1 cache 175 are filled into L0 I cache 180 coupled to speculative processor 120 and commit processor 110. It should be noted that embodiments of the invention may contain any combination of cache memory hierarchy without diverging from the scope of the invention.

In one embodiment of the invention, L0 D cache 190 comprises two L0 D cache components. One of the L0 D cache 190 components is coupled to commit processor 110, and the other L0 D cache 190 component is coupled to speculative processor 120. In this embodiment of the invention, the two L0 D cache components maintain duplicate information. In this embodiment of the invention, store instructions/commands (stores) associated with speculative processor 120 are not written into L0 D cache 190. In this embodiment of the invention line read and write requests are issued to L1 cache 175 from either L0 D cache component. Lines fetched from L1 cache 175 are filled into L0 D cache 190 components coupled to commit processor 110 and speculative processor 120. Stores issued from commit processor 110 are written into the L0 D cache component coupled to speculative processor 120. By having exact copies of data in each L0 D cache component, internal snooping is not necessary.

Figure 8:
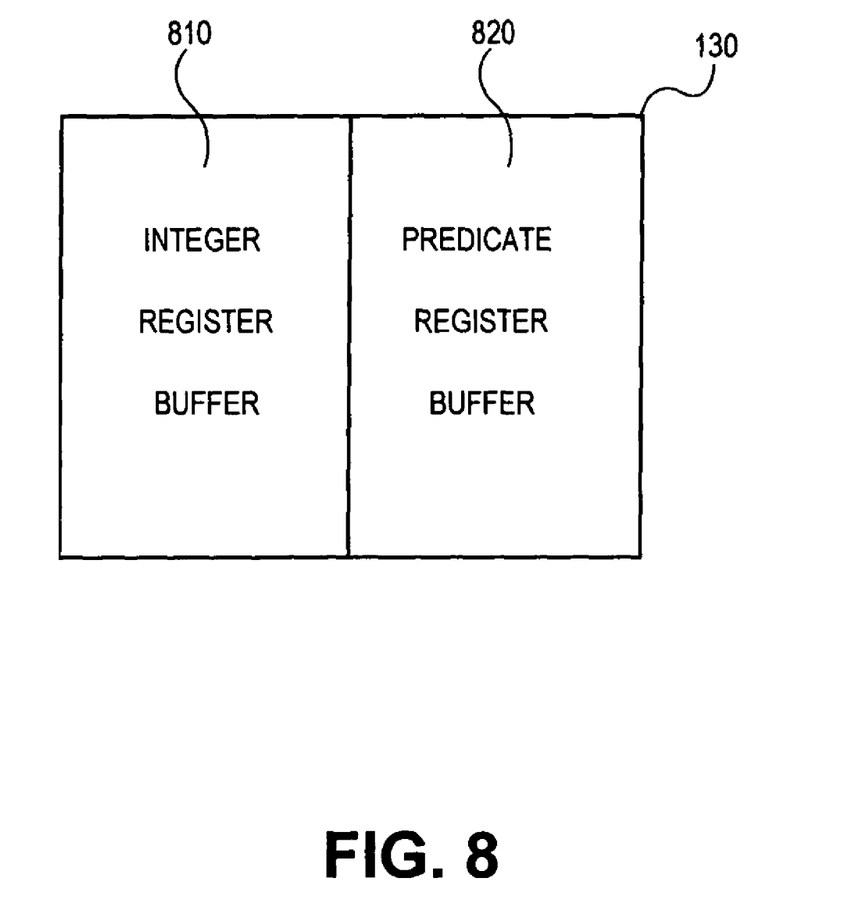
FIG. 8 illustrates a register file buffer.

In one embodiment of the invention, register file buffer 130 comprises integer register buffer 810 and predicate register file buffer 820 (illustrated in FIG. 8). In one embodiment of the invention integer register file buffer 810 comprises a plurality of write ports, a plurality of checkpoints and at least one read port. Integer register file buffer 810 is used to communicate register values from commit processor 110 to speculative processor 120. In one embodiment of the invention, integer register file buffer 810 comprises eight (8) write ports, four (4) checkpoints, and one (1) read port to access any of the checkpointed contexts. In one embodiment of the invention, integer register file buffer 810 has an eight (8) register wide array and sixteen (16) rows. In one embodiment of the invention, predicate register file buffer 820 comprises a plurality of write ports, a plurality of checkpoints and at least one read port. Predicate register file buffer 820 is used to communicate register values from commit processor 110 to speculative processor 120, and a second level register file coupled to speculative processor 120. In one embodiment of the invention, predicate register file buffer 820 comprises eight (8) write ports, four (4) checkpoints, and one (1) read port to access any of the checkpointed contexts. In one embodiment of the invention, predicate register file buffer 820 has an eight (8) register wide array and eight (8) rows.

Figure 2:
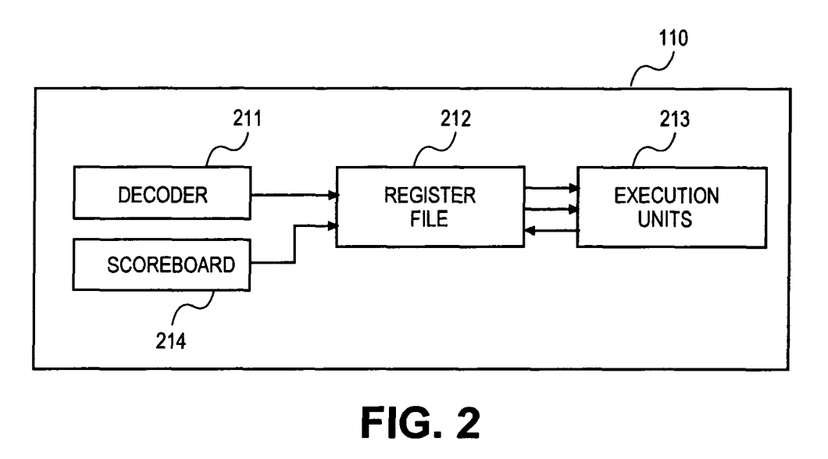
FIG. 2 illustrates a commit processor of an embodiment of the invention.
Figure 3:
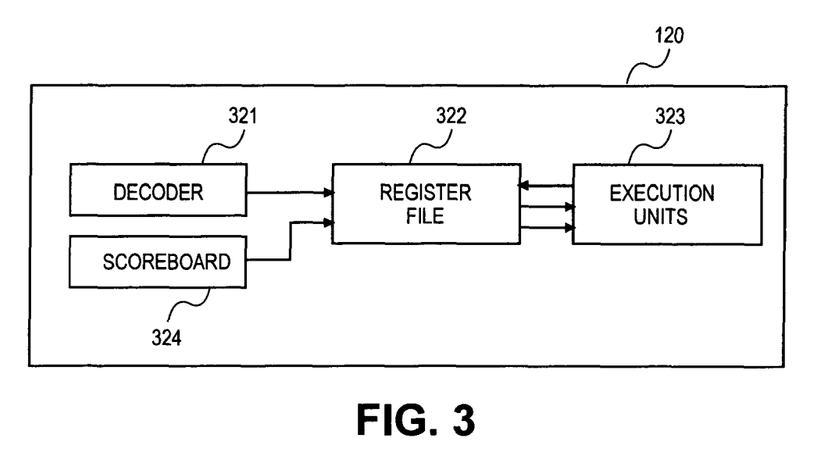
FIG. 3 illustrates a speculative processor of an embodiment of the invention.

FIG. 2 illustrates commit CPU 110. In one embodiment of the invention, commit CPU 110 comprises decoder 211, scoreboard 214, register file 212, and execution units 213. Likewise, FIG. 3 illustrates speculative CPU 120. In one embodiment of the invention, speculative CPU 120 comprises decoder 321, scoreboard 324, register file 322, and execution units 323. L2 cache 170 and L1 cache 175 are shared by commit CPU 110 and speculative CPU 120. In one embodiment of the invention, multiprocessor 100 is capable of executing explicitly multithreaded programs. In another embodiment, multiprocessor 100 is capable of executing single-threaded applications while using a multi-thread environment without converting the single-threaded application to an explicit multiple-thread application.

In one embodiment of the invention, program execution begins as a single thread on one of commit CPU 110 and speculative CPU 120. In one embodiment of the invention, commit CPU 110 fetches, decodes, executes and updates register file 212, as well as issue load instructions/commands (loads) and stores to memory as instructed by the program. As the instructions are decoded, commit CPU 110 may direct speculative CPU 120 to start executing a speculative thread at some program counter value. This program counter value may be the address of the next instruction in memory, or it may be supplied as a hint by a compiler. For example, a fork at a next instruction address may be a thread forked at a call instruction. Speculative CPU 120 continues its thread execution until a program counter in commit CPU 110 reaches the same point in the program execution for which the speculative thread program counter points. Therefore, commit CPU 110 fetches, issues and commits every instruction in the program, even when an instruction belongs to a speculative thread.

In one embodiment of the invention, the dual execution architecture of multiprocessor 100 has a benefit wherein speculative CPU 120, executing farther in the program, provides highly efficient prefetch of instructions and data. Also, speculative CPU 120 determines the direction of many branches before the control flow of commit CPU 110 reaches these branches. In one embodiment of the invention, commit CPU 110 receives information on control flow direction from speculative CPU 120, and therefore, commit CPU 110 can avoid branch prediction for many branches and the associated misprediction penalty. In one embodiment of the invention, dependent and adjacent instructions executed correctly by the speculative thread can have the results concurrently committed in one commit cycle by commit CPU 110, saving time normally required to serially execute and propagate results between dependent instructions.

In one embodiment of the invention, input register values to the speculative thread are communicated through register buffer 130. All values written into register file 212, of commit CPU 110, are also written into register file buffer 130. In one embodiment of the invention when the speculative thread is spawned, a snapshot of register file 212 is available in register file buffer 130, located between commit CPU 110 and speculative CPU 120. Initially, when a speculative thread is started, none of speculative CPU 120's registers have the input value stored in them. Input registers that are needed may be read on demand from register file buffer 130. In one embodiment of the invention, scoreboard 324 in speculative CPU 120's decode stage is used to keep track of which registers are loaded from register file buffer 130, or written by the speculative thread. Those registers are valid in register file 322. All other registers are read on demand from register file buffer 130.

In one embodiment of the invention, input memory values to the speculative thread are read from the coherent cache hierarchy, allowing the speculative thread to access memory modified by the commit thread. In one embodiment of the invention, a cache coherency scheme is used where d-cache 190 is a write through cache, and L2 cache 170 is a write back cache using a MESI (M: modified; E: exclusive; S: shared; I: invalid) cache coherency protocol. One should note, however, that other cache coherency protocols may also be used in other embodiments of the invention.

Depending on the data flow in a particular program, commit CPU 110 may produce some register or memory input values after these inputs are read by the speculative thread. In one embodiment of the invention, to relax the limitations imposed by register and memory data flow, value prediction is used to provide initial input values to the speculative thread. In one embodiment of the invention, a simple value prediction method is used having passive prediction. In this embodiment, it is assumed that register and memory input values have already been produced by commit CPU 110 at the time the speculative thread is spawned.

In one embodiment of the invention, speculative results are written into register file 322 of CPU 120 as well as trace buffer 140. In one embodiment of the invention, trace buffer 140 is a circular buffer implemented as an array with head and tail pointers. In one embodiment of the invention, the head and tail pointers have a wrap-around bit. In one embodiment of the invention, trace buffer 140 has an array with one read port and one write port. In this embodiment of the invention, each entry has enough bytes to store the results of a number of instructions at least equal in number to the issue width of commit CPU 110. In this embodiment of the invention, each entry has a bit per instruction, with a second write port used to mark mispredicted loads.

In one embodiment of the invention, trace buffer 140 has one hundred-and-twenty-eight (128) entries that can each store results for six (6) instructions. In one embodiment of the invention, trace buffer 140 has four (4) partitions to support four (4) threads. In one embodiment of the invention, trace buffer 140 accommodates sixteen (16) bytes for storing two outputs per instruction, four (4) bytes to store renamed registers, and one (1) bit to mark if an instruction is a mispredicted load. In one embodiment of the invention, the mispredicted load bit can be set by six (6) write ports from load buffer 150. In one embodiment of the invention, when a thread partition is full, speculative execution is continued to prefetch into L0 I cache 180 and L0 D cache 190, but results are not written into the trace buffer.

In one embodiment of the invention commit CPU 110 has scoreboard 214 that comprises one bit per register. In this embodiment of the invention, any modification of a register by commit CPU 110 between the fork point and the join point of a speculative thread causes the register scoreboard bit to be set. As commit CPU 110 retires the speculative thread results, it continuously keeps track in scoreboard 214 of all registers that are mispredicted. In this embodiment of the invention, instructions whose source register scoreboard bits are clear are safely committed into register file 212. Such instructions, even if dependent, do not have to be executed. There are some exceptions, however, such as loads and stores. Load and store exceptions have to be issued to memory execution units 213 to service cache misses and to check for memory ordering violations. Results of branch execution are also sent from speculative CPU 120 to commit CPU 110. Branch prediction in commit CPU 110 can be bypassed for some or all of the branches executed by speculative CPU 120.

In one embodiment of the invention loads and stores associated with commit processor 110 snoop load buffer 150. In one embodiment of the invention, when an instruction is replayed or if an instruction is a mispredicted load, the instructions associated destination register bit is set in scoreboard 214. When the instruction is clean, its destination register bit is cleared in scoreboard 214. Note that an instruction is clean when its sources are clean. Scoreboard 214 is cleared when all speculative thread instructions are committed.

Figure 4:
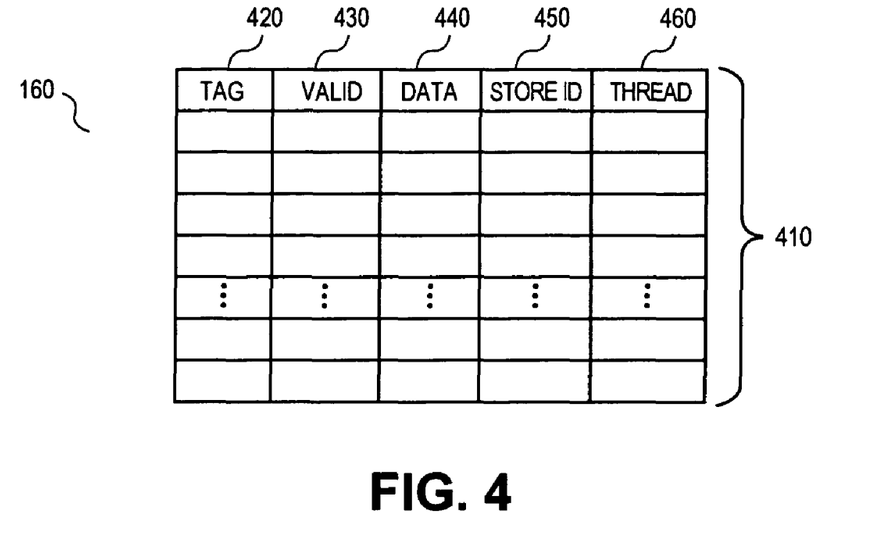
FIG. 4 illustrates a store-forwarding buffer of an embodiment of the invention.

In one embodiment of the invention, speculative CPU 120 does not issue store instructions to memory. In this embodiment of the invention, store instructions are posted in store buffer 160 and load instructions are posted in load buffer 150. In one embodiment of the invention, store buffer 160 is a fully associative store forwarding buffer. FIG. 4 illustrates the structure of store buffer 160 in one embodiment of the invention. In store buffer 160 (illustrated in FIG. 4) each entry 410 comprises tag portion 420, valid portion 430, data portion 440, store identification (ID) 450 and thread ID portion 460. In one embodiment of the invention data portion 440 accommodates eight (8) bytes of data. In one embodiment of the invention valid portion 430 accommodates eight (8) bits. Store ID 450 is a unique store instruction ID of the last store instruction to write into an entry 410. In one embodiment of the invention, speculative loads access store buffer 160 concurrently with L0 D cache 190 access. If the load hits a store instruction in store buffer 160, L0 D cache 190 is bypassed and a load is read from store buffer 160. In this case, store ID 450 is also read out with the data.

In one embodiment of the invention, load data can be obtained by speculative processor 120 from either store buffer 160 or L0 D cache 190 associated with speculative processor 120. In one embodiment of the invention, loads are posted into load buffer 150. In this embodiment of the invention, when a load is posted, a mispredicted load bit is set in trace buffer 140 in case of load buffer 150 overflow.

In one embodiment of the invention store buffer 160 has one hundred-and-twenty-eight (128) entries, where the entries are four (4) way set associative. In one embodiment of the invention, store buffer 160 has two (2) store and two (2) load ports. In one embodiment of the invention store buffer 160 allows a partial tag match using virtual addresses for forwarding, and a full physical tag match to validate forwarding store ID's. In one embodiment of the invention store buffer 160 stores data written in data portion 440 starting from the first byte to avoid alignment delay. In one embodiment of the invention store buffer 160 has a replacement policy that replaces the oldest store upon a store miss, otherwise it replaces a hit entry. In one embodiment of the invention thread ID 460 is an index to a partition in trace buffer 140, and has a wrap around bit. In one embodiment of the invention, a global reset of thread entries is performed by using a thread ID content addressable memory (CAM) port (not shown).

Figure 5:
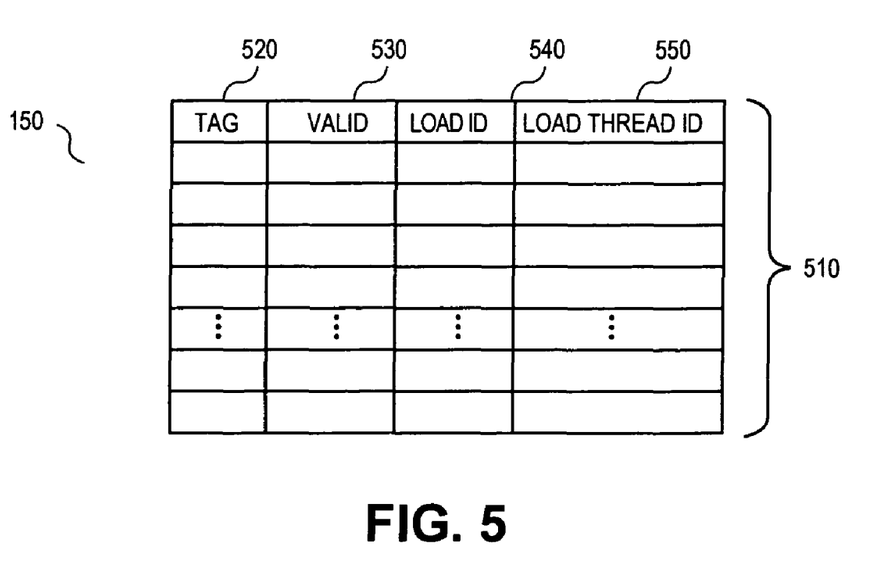
FIG. 5 illustrates a load-ordering buffer of an embodiment of the invention.

In one embodiment of the invention, speculative loads are posted in load buffer 150. In one embodiment of the invention, load buffer 150 is a set associate load buffer coupled to commit CPU 110. FIG. 5 illustrates the structure of load buffer 150. In load buffer 150 (illustrated in FIG. 5) each entry 510 comprises a tag portion 520, an entry valid bit portion 530, load ID 540, and load thread ID 550. In one embodiment of the invention, tag portion 520 comprises a partial address tag. In another embodiment, each entry 510 additionally has a store thread ID, a store ID, and a store valid bit (not shown). The Store ID is the ID of the forwarding store instruction if the load instruction has hit the store buffer 160.

Figure 9:
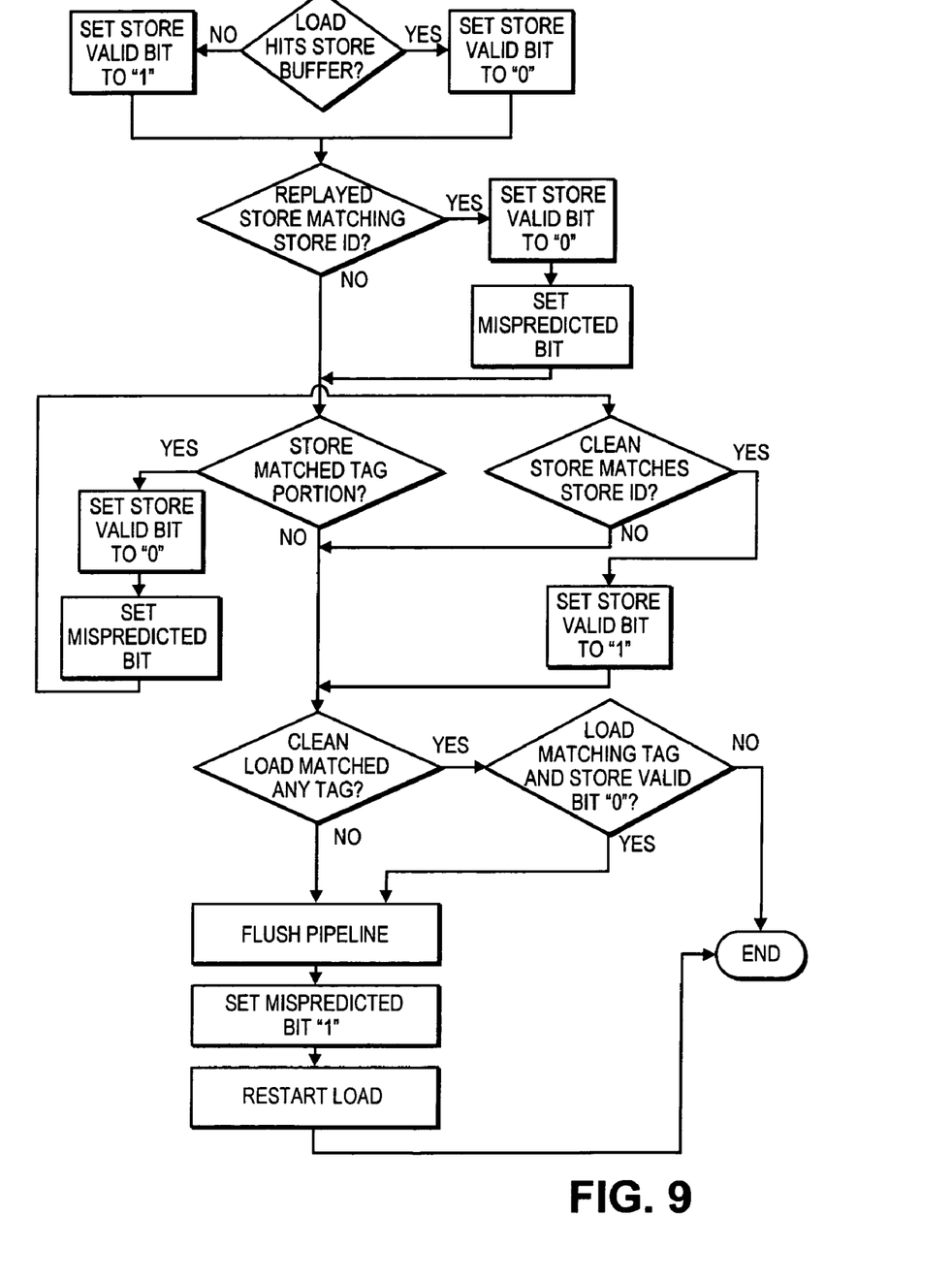
FIG. 9 illustrates a block diagram of a process of an embodiment.

In one embodiment of the invention the store ID and/or load ID 550 is an index into an entry in trace buffer 140, which is unique per instruction. In one embodiment of the invention the store valid bit is set to zero ("0") if a load hits store buffer 160. In this embodiment of the invention, the store valid bit is set to one ("1") if the load missed store buffer 160. In one embodiment of the invention, a replayed store that has a matching store ID clears (sets to "0") the store valid bit and sets the mispredicted bit in the load entry in trace buffer 140. In one embodiment of the invention, a later store in the program that matches tag portion 520 clears (sets to "0") the store valid bit and sets the mispredicted bit in the load entry in trace buffer 140. In one embodiment of the invention, a clean (not replayed) store that matches the store ID sets the store valid bit to "1" (one). In one embodiment of the invention, upon a clean (not replayed) load not matching any tag portion 520, or a load matching tag portion 520 with the store valid bit clear (set to "0"), the pipeline is flushed, the mispredicted bit in the load entry in trace buffer 140 is set to one ("1"), and the load instruction is restarted. In one embodiment of the invention, when a load entry is retired, entry valid bit portion 530 is cleared. FIG. 9 illustrates a block diagram of a process including setting/clearing the above status bits, and instruction pipeline flow.

In one embodiment of the invention, load buffer 150 has sixty-four (64) entries that are four (4) way set associative. In one embodiment of the invention, load buffer 150 has a policy that replaces an oldest load. In one embodiment of the invention a global reset of thread entries is performed by using a thread ID CAM port (not shown).

In one embodiment of the invention, commit CPU 110 issues all loads and stores to memory execution units 213 (address generation unit, load buffer, data cache), including loads that were correctly executed by speculative processor 120. Valid load data with potentially dependent instructions could be committed, even when a load instruction issued by commit processor 110 misses L0 D cache 190. In one embodiment of the invention, a load miss request is sent to L2 cache 170 to fill the line, but the return data is prevented from writing to register file 212. In one embodiment of the invention, every load instruction accesses load buffer 150. A load miss of load buffer 150 causes a pipeline flush and a restart of the load instruction and all instructions that follow it.

In one embodiment of the invention, stores also access load buffer 150. In one embodiment of the invention, when an address matching store that also matches store ID 540, validity bit 530 is set in an entry 510. In this embodiment of the invention, a later store that hits an entry 510 invalidates the entry 510. In this embodiment of the invention when a store invalidates an entry 510, a load ID 550 is used to index trace buffer 140 to set the miss predicted load bit. In this embodiment of the invention when a load is fetched and the mispredicted load bit in trace buffer 140 is found to be set, a register bit is set in scoreboard 214. This register scoreboard bit may also be called the load destination scoreboard bit. In this embodiment of the invention, this optimization reduces the number of flushes that occur as the result of load misses in load buffer 150. One should note that commit CPU 110 concurrently reads trace buffer 140 and L0 I cache 180. In this embodiment of the invention, this concurrent read of trace buffer 140 and L0 I cache 180 enables setting a scoreboard register bit in scoreboard 214 for a mispredicted load instruction in time without having to stall the execution pipeline.

In one embodiment of the invention "replay mode" execution starts at the first instruction of a speculative thread. When a partition in trace buffer 140 is becoming empty, replay mode as well as speculative thread execution are terminated. In one embodiment of the invention, instruction issue and register rename stages are modified as follows: no register renaming since trace buffer 140 supplies names; all instructions up to the next replayed instruction, including dependent instructions are issued; clean (not replayed) instructions are issued as no-operation (NOPs) instructions; all loads and stores are issued to memory, and clean instruction results are committed from trace buffer 140 to register file 130.

Figure 6:
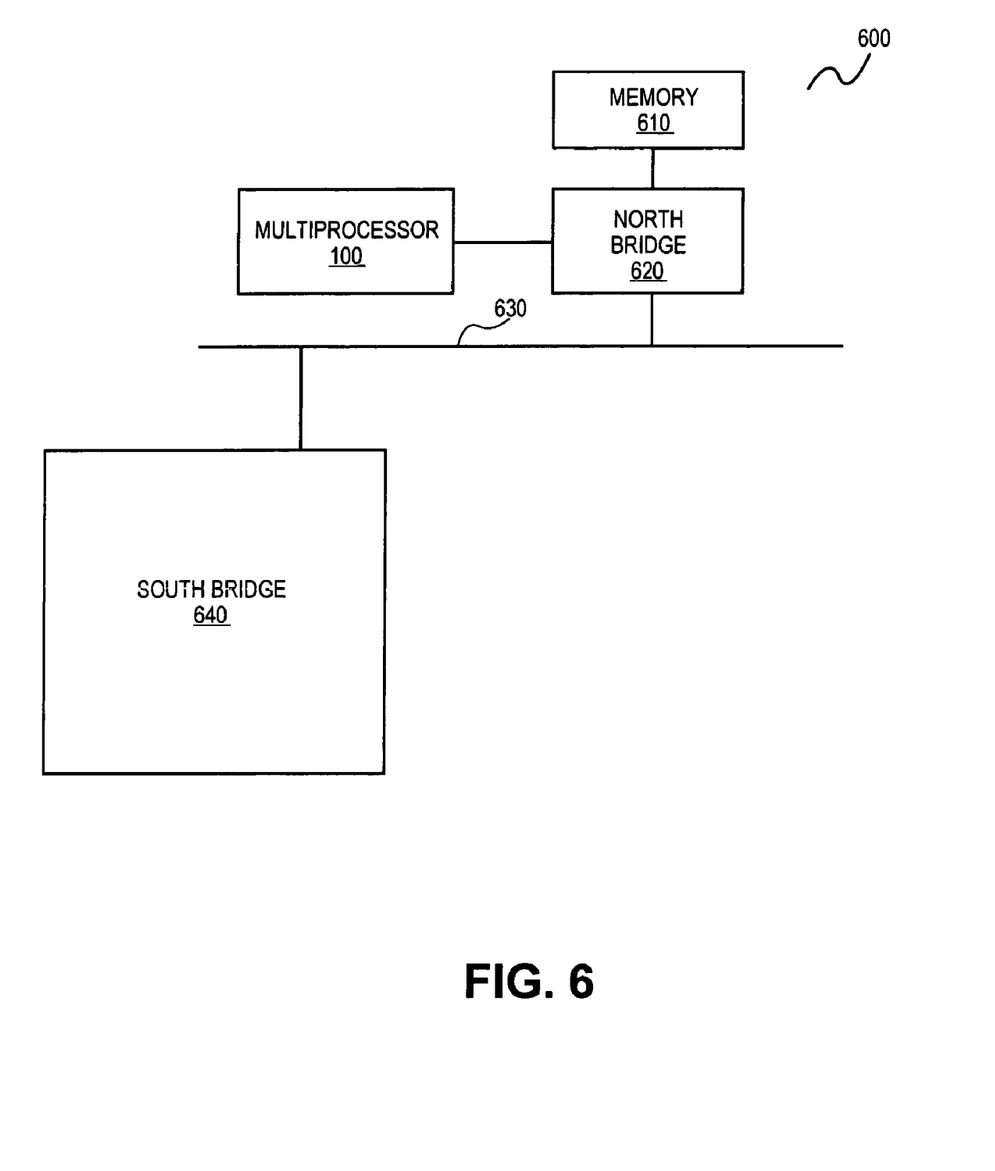
FIG. 6 illustrates an embodiment of the invention having a system.

FIG. 6 illustrates system having an embodiment of the invention. System 600 comprises multiprocessor 100 (see FIG. 1), main memory 610, north bridge 620, hublink 630, and south bridge 640. Typically, the chief responsibility of north bridge 620 is the multiprocessor interface. In addition, north bridge 620 may also have controllers for an accelerated graphics port (AGP), memory 610, and hub link 630, among others. South bridge 640 is typically responsible for a hard drive controller, a universal serial bus (USB) host controller, an input/output (I/O) controller, and any integrated sound devices, amongst others. In one embodiment of the invention, multiprocessor 100 contains embodiments of the invention described above.

Figure 7:
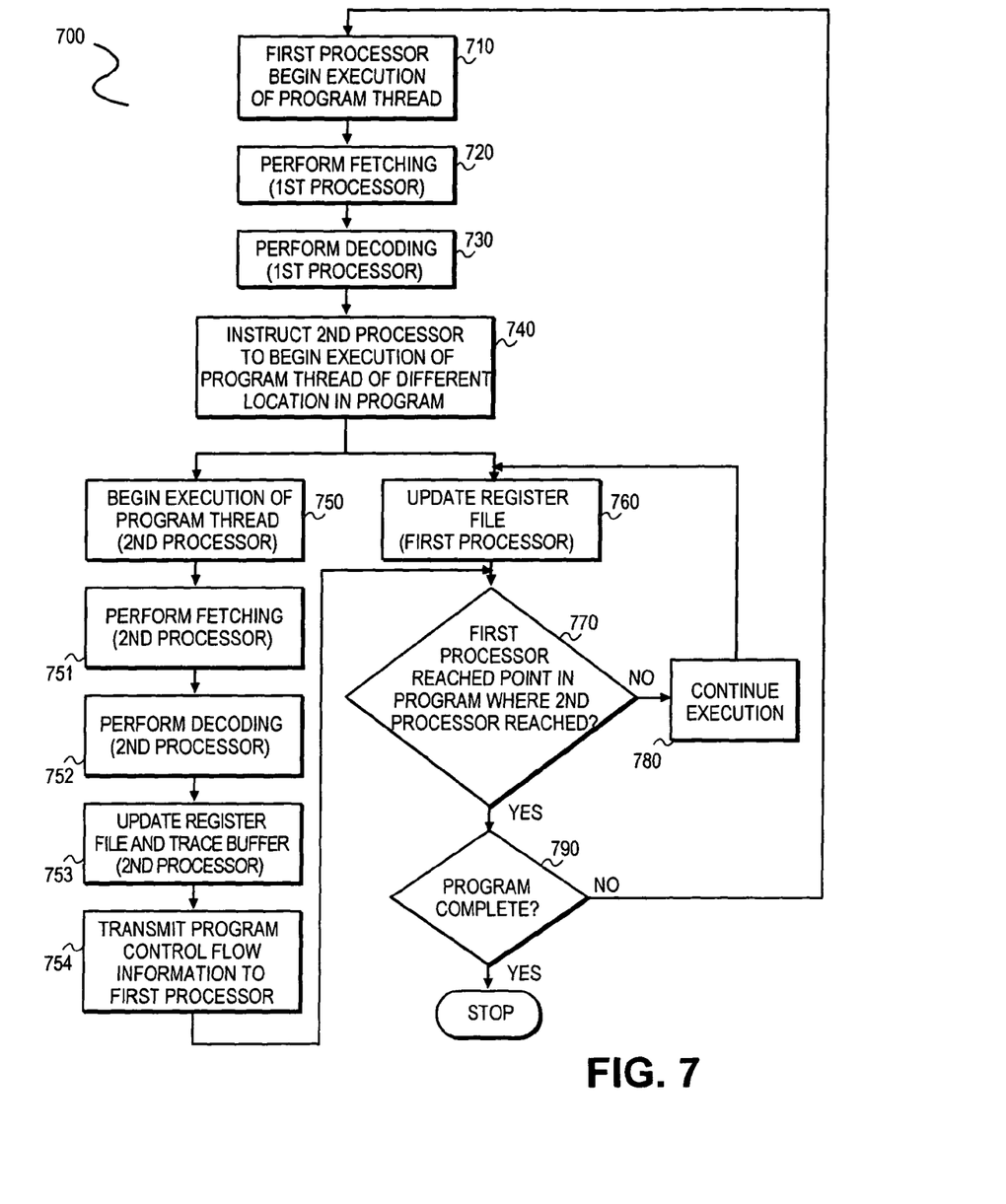
FIG. 7 illustrates a block diagram of an embodiment of the invention.

FIG. 7 illustrates a process for an embodiment of the invention. Process 700 begins with block 710 which, starts the execution of a program thread by a first processor, such as commit processor 110. Block 720 performs fetching of commands by the first processor. Block 730 performs decoding of commands by the first processor. Block 740 instructs a second processor, such as speculative processor 120, to begin program execution of the same thread as the first processor, but at a location further in the program stream. Block 750 begins execution of the program thread by the second processor. On block 751 the second processor fetches commands. In block 752, the second processor performs decoding.

In block 753, the second processor updates a register file. In block754, the second processor transmits control flow information to the first processor. In block 760, the first processor updates a register file. Block 770 determines whether the first processor has reached the same point of execution as the second processor. If block 770 determines that the first processor has not yet reached the same point in the program, process 700 continues with block 780 to continue execution. If block 770 determines that the first processor has reached the same point in the execution as the second processor, block 790 determines if the program is complete. If block 790 determines that the program is complete, process 700 stops, otherwise, process 700 continues at block 710.

With the use of embodiments of the invention discussed above, performance can be increased when executing single-threaded applications as a result of the speculative long-range multithreaded pre-fetch and pre-execution. The embodiments of the invention can be implemented with in-order and out-of-order multithreaded processors.

The above embodiments can also be stored on a device or machine-readable medium and be read by a machine to perform instructions. The machine-readable medium includes any mechanism that provides (i.e., stores and/or transmits) information in a form readable by a machine (e.g., a computer). For example, a machine-readable medium includes read only memory (ROM); random access memory (RAM); magnetic disk storage media; optical storage media; and flash memory devices. The device or machine-readable medium may include a solid state memory device and/or a rotating magnetic or optical disk. The device or machine-readable medium may be distributed when partitions of instructions have been separated into different machines, such as across an interconnection of computers.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A hardware system comprising:
 a first processor and a second processor each having a register file, a scoreboard and a decoder;
 a bus coupled to the first processor and the second processor;
 a main memory coupled to the bus;
 a first buffer coupled to the first processor and the second processor to transfer register values from the first processor to the second processor;
 a second buffer coupled to the first processor and the second processor to transfer values from the second processor to the first processor; and
 wherein the second processor is to execute a portion of instructions of an application ahead of execution of a current instruction of the application by the first processor, and the first processor is to fetch, issue, and avoid execution of the portion of instructions by commitment of results of the portion of instructions into the register file of the first processor from the second buffer.

2. The system of claim 1, wherein the first processor is coupled to at least one of a plurality of zero level (L0) data caches and at least one of a plurality of L0 instruction caches, and the second processor is coupled to at least one of the plurality of L0 data caches and at least one of the plurality of L0 instruction caches.

3. The system of claim 2, wherein each of the plurality of L0 data caches is to store exact copies of store instruction data.

4. The system of claim 2, wherein the first processor and the second processor each share a first level (L1) cache and a second level (L2) cache.

5. The system of claim 1, further comprising a plurality of memory instruction buffers including at least one store forwarding buffer and at least one load ordering buffer.

6. The system of claim 5, wherein the at least one store forwarding buffer includes a structure having a plurality of entries, each of the plurality of entries having a tag portion, a validity portion, a data portion, a store instruction identification (ID) portion, and a thread ID portion.

7. The system of claim 1, wherein the first processor is to commit results in one commit cycle based at least on information received from the second processor.

8. A hardware apparatus comprising:
 a first processor and a second processor each having a scoreboard and a decoder;
 a first buffer coupled to the first processor and the second processor, the first buffer being a register buffer that is operable to transfer register values from the first processor to the second processor;
 a second buffer coupled to the first processor and the second processor; and
 wherein the first processor is to direct the second processor to execute a portion of instructions of a single threaded application ahead of a current instruction, of the single threaded application, executed by the first processor, wherein the first processor is to fetch, issue, and avoid execution of the portion of instructions by commitment of results of the portion of instructions into a register file from the second buffer.

9. The apparatus of claim 8, further comprising a plurality of caches coupled to the first and second processors.

10. The apparatus of claim 8, wherein the first processor is coupled to at least one of a plurality of zero level (L0) data caches and at least one of a plurality of L0 instruction caches, and the second processor is coupled to at least one of the plurality of L0 data caches and at least one of the plurality of L0 instruction caches.

11. The apparatus of claim 10, wherein each of the plurality of L0 data caches is to store exact copies of store instruction data.

12. The apparatus of claim 8, further comprising a plurality of memory instruction buffers including at least one store forwarding buffer and at least one load ordering buffer.

13. The apparatus of claim 12, wherein the at least one store forwarding buffer comprises a structure having a plurality of entries, each of the plurality of entries having a tag portion, a validity portion, a data portion, a store instruction identification (ID) portion, and a thread ID portion.

14. The apparatus of claim 13, wherein the at least one load ordering buffer comprises a structure having a plurality of entries, each of the plurality of entries having a tag portion, an entry validity portion, a load identification (ID) portion, and a load thread ID portion.

15. The apparatus of claim 8, wherein the register buffer comprises an integer register buffer and a predicate register buffer.

16. A method comprising:
directing, by a first processor, a second processor to execute a plurality of instructions in a thread, wherein the plurality of instructions is at a location in a stream of the thread ahead of a current instruction executed in the first processor;
receiving control flow information from the second processor in the first processor to avoid branch prediction in the first processor; and
receiving results from the second processor in the first processor so that the first processor fetches, issues, and avoids execution of the plurality of instructions by committing the results of the plurality of instructions into a register file of the first processor from a first buffer.

17. The method of claim 16, further comprising tracking at least one register that is one of loaded from a register file buffer and written by said second processor, said tracking executed by said second processor.

18. The method of claim 16, further comprising clearing a store validity bit and setting a mispredicted bit in a load entry in the first buffer if a replayed store instruction has a matching store identification (ID) portion in a second buffer.

19. The method of claim 16, further comprising:
setting a store validity bit if a store instruction that is not replayed matches a store identification (ID) portion in a load buffer.

20. The method of claim 16, further comprising:
flushing a pipeline, setting a mispredicted bit in a load entry in the first buffer and restarting a load instruction if the load instruction is not replayed and does not match a tag portion in a load buffer, or the load instruction matches the tag portion in the load buffer while a store valid bit is not set.

21. The method of claim 16, further comprising:
executing a replay mode at a first instruction of a speculative thread.

22. The method of claim 16, further comprising:
supplying names from the first buffer to preclude register renaming;
issuing all instructions up to a next replayed instruction including dependent instructions;
issuing instructions that are not replayed as no-operation (NOP) instructions;
issuing all load instructions and store instructions to memory; and
committing non-replayed instructions from the first buffer to the register file.

23. The method of claim 16, further comprising:
clearing a valid bit in a first entry in a load buffer if an instruction corresponding to the first entry is retired.

24. An article comprising a machine-readable storage medium containing first instructions which, when executed by a machine, cause the machine to perform operations comprising:
directing, by a first processor, a second processor to execute a plurality of instructions in a thread, wherein the plurality of instructions is at a location in a stream of the thread ahead of a current instruction executed in the first processor;
receiving control flow information from the second processor in the first processor to avoid branch prediction in the first processor; and
receiving results from the second processor in the first processor so that the first processor fetches, issues, and avoids execution of the plurality of instructions by committing the results of the plurality of instructions into a register file of the first processor from a first buffer.

25. The article of claim 24, wherein the first instructions further cause the machine to perform operations comprising tracking at least one register that is one of loaded from a register file buffer and written by said second processor, said tracking executed by said first processor.

26. The article of claim 24, wherein the first instructions further cause the machine to perform operations comprising clearing a store validity bit and setting a mispredicted bit in a load entry in the first buffer if a replayed store instruction has a matching store identification (ID) portion in a second buffer, the second buffer being a load buffer.

27. The article of claim 24, wherein the first instructions further cause the machine to perform operations including:
duplicating memory information in separate memory devices for independent access by the first processor and the second processor.

28. The article of claim 24, wherein the first instructions further cause the machine to perform operations including:
setting a store validity bit if a store instruction that is not replayed matches a store identification (ID) portion.

29. The article of claim 24, wherein the first instructions further cause the machine to perform operations including:
flushing a pipeline, setting a mispredicted bit in a load entry in a second buffer and restarting a load instruction if the load instruction is not replayed and does not match a tag portion in a load buffer, or the load instruction matches the tag portion in the load buffer while a store valid bit is not set.

30. The article of claim 24, wherein the first instructions further cause the machine to perform operations including:
executing a replay mode at a first instruction of a speculative thread;
terminating the replay mode and the execution of the speculative thread if a partition in the first buffer is approaching an empty state.

31. The article of claim 24, wherein the first instructions further cause the machine to perform operations including:
supplying names from the first buffer to preclude register renaming;
issuing all instructions up to a next replayed instruction including dependent instructions;
issuing instructions that are not replayed as no-operation (NOP) instructions;
issuing all load instructions and store instructions to memory;
committing non-replayed instructions from the first buffer to the register file.

32. The article of claim 24, wherein the first instructions further cause the machine to perform operations including:
clearing a valid bit in a first entry in a load buffer if an instruction corresponding to the first entry is retired.

* * * * *